United States Patent [19]

Hiraoka

[11] Patent Number: 5,061,888

[45] Date of Patent: Oct. 29, 1991

[54] METHOD AND APPARATUS FOR DRIVING STEPPING MOTOR

[75] Inventor: Satoshi Hiraoka, Tokyo, Japan

[73] Assignee: Kabushiki Kaisha Toshiba, Kawasaki, Japan

[21] Appl. No.: 462,976

[22] Filed: Jan. 10, 1990

Related U.S. Application Data

[63] Continuation of Ser. No. 250,860, Sep. 29, 1988, abandoned.

[30] Foreign Application Priority Data

Sep. 30, 1987 [JP] Japan ................................ 62-243920

[51] Int. Cl.$^5$ ............................................. H02P 8/00
[52] U.S. Cl. ...................................... 318/696; 318/685
[58] Field of Search ................................ 318/696, 685

[56] References Cited

U.S. PATENT DOCUMENTS

| 4,471,282 | 9/1984 | Moriguchi | 318/696 |
| 4,495,455 | 1/1985 | Araki | 318/696 |
| 4,642,544 | 2/1987 | Furumura et al. | 318/696 |

Primary Examiner—William M. Shoop, Jr.
Assistant Examiner—Saul M. Bergmann
Attorney, Agent, or Firm—Oblon, Spivak, McClelland, Maier & Neustadt

[57] ABSTRACT

A driving apparatus for a stepping motor with a rotor and a plurality of windings, adapted for reduction of fluctuation of the rotor, comprises a driver responsive to drive control data for selectively driving each of said plurality of windings, a current controller responsive to current control data for controlling a driving current applied to the stepping motor, and a controller responsive to a rotation command for generating and applying the current control data and the drive control data to the current controller and the driver, respectively.

8 Claims, 4 Drawing Sheets

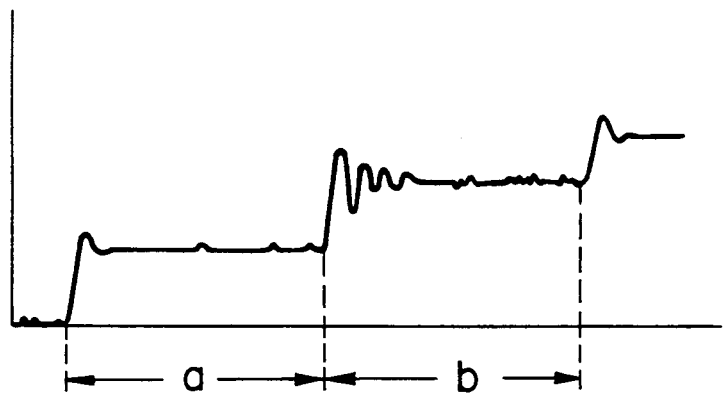
F I G. 5
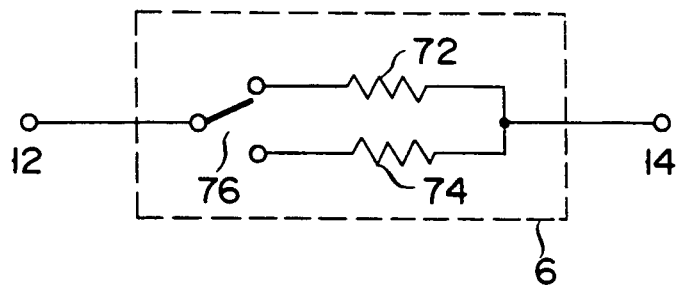
F I G. 6

| ADDRESS | DATA | | | | |
|---|---|---|---|---|---|
| | S1 | S2 | | | |
| | | A | B | $\overline{A}$ | $\overline{B}$ |
| XXX0 | 1 | 1 | 0 | 0 | 0 |
| XXX1 | 0 | 1 | 1 | 0 | 0 |
| XXX2 | 1 | 0 | 1 | 0 | 0 |
| XXX3 | 0 | 0 | 1 | 1 | 0 |
| XXX4 | 1 | 0 | 0 | 1 | 0 |
| XXX5 | 0 | 0 | 0 | 1 | 1 |
| XXX6 | 1 | 0 | 0 | 0 | 1 |
| XXX7 | 0 | 1 | 0 | 0 | 1 |
F I G. 3
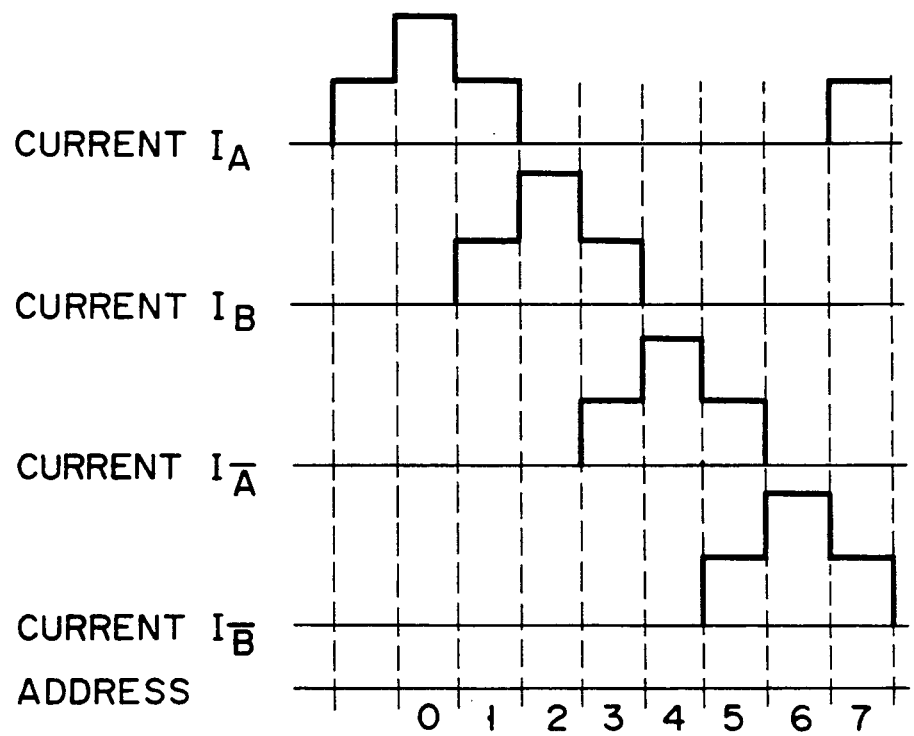
F I G. 4

METHOD AND APPARATUS FOR DRIVING STEPPING MOTOR

This application is a continuation of application Ser. No. 250,860, filed on Sept. 29, 1988, now abandoned.

BACKGROUND OF THE INVENTION

1. Field of the Invention

The present invention relates to a method and apparatus for driving a stepping motor used in facsimile terminal.

2. Description of the Related Art

In general, a stepping motor is driven in a one-phase excitation mode in which one winding in the stepping motor is excited or in a two-phase excitation mode in which two adjacent windings in the stepping motor is excited. When the stepping motor is driven, a rotor of the stepping motor will rotate with fluctuation greater in the two-phase excitation mode than in the one-phase excitation mode.

FIG. 1 is a graph showing a rotation state of the rotor of the stepping motor in a prior-art driving apparatus. In this Figure, portion a shows the rotation state in the one-phase excitation mode, and portion b the rotation state in the two-phase excitation mode. An applied voltage to the stepping motor in the two-phase excitation mode is the same as that in the one-phase excitation mode. As can been seen from this graph, the rotor fluctuation in the two-phase excitation mode has the damping factor lower than that in the one-phase excitation mode.

As described above, in the conventional stepping motor driving apparatus, the rotor fluctuation depends on whether or not the stepping motor is driven in the two-phase excitation mode. An increase in the fluctuation results in an increase in noise level of a driving system. To solve this problem, a vibration-proof material might be attached to the stepping motor. However, this would result in increased weight and cost.

SUMMARY OF THE INVENTION

It is accordingly an object of the present invention to provide a method and apparatus for driving a stepping motor, capable of damping oscillation of a rotor.

The driving apparatus for a stepping motor with a rotor and a plurality of windings comprises a driver responsive to drive input control data for selectively driving each of the plurality of windings, a current controller responsive to input current control data for controlling a driving current applied to the stepping motor, and a controller responsive to an input rotation command for generating and applying the current control data and the drive control data to the current controller and the driver, respectively.

A method of driving a stepping motor comprises the steps of: generating current control data and drive control data in response to a rotation command; controlling a driving current applied to the stepping motor in response to the current control data; and selectively driving each of the plurality of windings in response to the driving control data.

According to the stepping motor driving apparatus of the present invention, the fluctuation of the rotor can be reduced, and thus paper can be fed stably in facsimile terminal.

BRIEF DESCRIPTION OF THE DRAWINGS

FIG. 3 shows data stored in the ROM of FIG. 2;

FIG. 4 is a timing chart used for explaining the operation of the embodiment;

FIG. 5 is a graph showing the fluctuation state of a rotor of a stepping motor driven by the driving apparatus of the present invention;

FIG. 6 shows a modification of the current control section of FIG. 2; and

DETAILED DESCRIPTION OF THE PREFERRED EMBODIMENT

Figure 1:
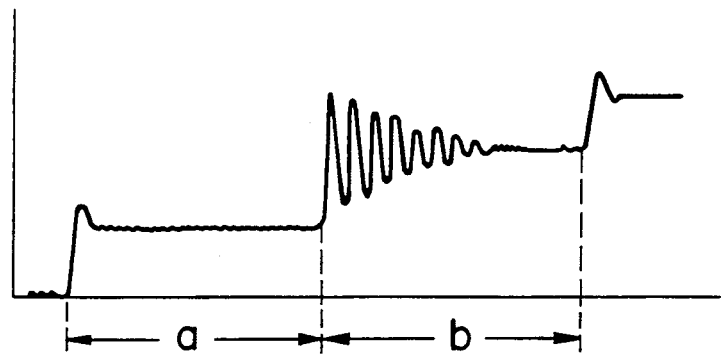
FIG. 1 is a graph showing states of oscillation of a rotor of a stepping motor driven by a conventional driving device.
Figure 2:
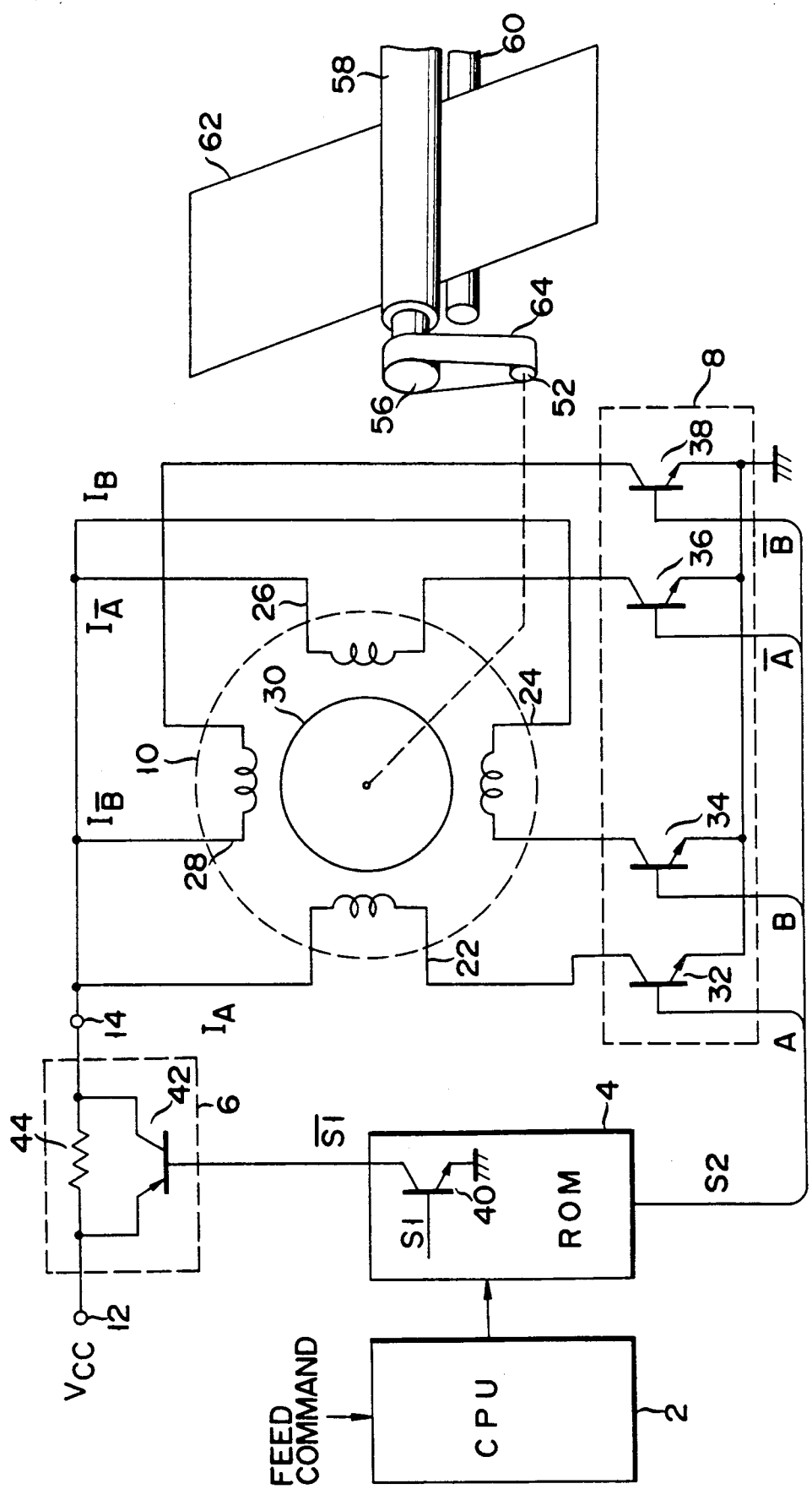
FIG. 2 is a block diagram of a stepping motor driving apparatus according to an embodiment of the present invention.

Referring now to FIG. 2, a stepping motor driving apparatus according to an embodiment of the present invention includes CPU (central processor unit) 2 for controlling the feed of paper 62 in facsimile terminal equipment in response to an input feed command. ROM (read only memory) 4 responds to address information sequentially output from CPU 2 as a rotation control instruction to produce and respectively apply signals $\overline{S1}$ and S2 to current control section 6 and driver 8. Current control section 6 controls current to be applied to stepping motor 10 in accordance with an inverted signal of signal S1. Driver 8 drives stepping motor 10 in response to signal S2.

Rotor 30 of motor 10 is coupled to pulley 52. Pulley 56 is driven by pulley 52 through belt 64. Pulley 56 is coupled to driving roller 58. Paper 62 is fed by pinch roller 60 and driving roller 58.

Current control section 6 is comprised of transistor 42 and resistor 44. Resistor 44 has about twice resistance than each winding has, in this embodiment. Transistor 42 has its emitter connected to terminal 12 of a constant voltage source Vcc along with one end of resistor 44. The collector of transistor 42 is connected to terminal 14 along with the other end of resistor 44. The base of transistor 42 is connected to the collector of transistor 40 in ROM 4. The base of transistor 40 is supplied with signal $\overline{S1}$, and hence signal S1 is applied to the base of transistor 42. Transistor 42 acts as a switch.

Stepping motor 10 is comprised of rotor 30 and windings 22, 24, 26 and 28. Rotor 30 is coupled to pulley 52 as described above. Windings 22, 24, 26 and 28 each have one end connected to terminal 14. The other ends of windings 22, 24, 26 and 28 are connected to collectors of transistors 32, 34, 36 and 38 in driver 8, respectively. To drive windings 22, 24, 26 and 28, transistors 32, 34, 36 and 38 are supplied at their bases with data A, B, $\overline{A}$ and $\overline{B}$ as signal S2.

Subsequently, the operation of the embodiment will be described with reference to FIGS. 3 and 4. Here it is assumed that stepping motor 10 is driven by the one-two phase exciting method.

In response to the entry of a feed command CPU 2 sequentially issues to ROM 4 address information as a rotation control instruction. As shown in FIG. 3, ROM 3 stores data S1 for controlling current applied to stepping motor 10 and data S2 including data A, B, $\overline{A}$ and $\overline{B}$ for driving stepping motor 10. When data S1 is at logic 1, it represents that the stepping motor should be driven in the one-phase excitation mode. On the other hand, data signal S1 being at logic 0 represents that the stepping motor should be driven in the two-phase excitation mode. Data signal S1 is applied to the base of transistor 42 via transistor 40 as signal $\overline{S1}$. When data signal S1 is at logic 1, transistor 42 is turned on, so that a first current is applied from terminal 12 to motor 10 via transistor 42. Conversely, when data signal S1 is at logic 0, transistor 42 is turned off. At this time, a second current applied to motor 10 via resistor 44 is larger than the first current. In this embodiment, a half of the second current in the two-phase excitation mode is chosen to be about 60% of the first current in the one-phase excitation mode.

As signal S2, data A, B, $\overline{A}$ and $\overline{B}$ are applied to transistors 32, 34, 36 and 38, respectively, of driver 8. When each of data A, B, $\overline{A}$ and $\overline{B}$ is at logic 1, a corresponding transistor is turned ON and the winding connected thereto is thereby set to be in a conductive state, while, when at logic 0, the corresponding transistor is turned OFF.

Assume now that the present address information is "xxx0", and motor 10 is, therefore, in the one-phase excitation mode. In this mode, data signal S1 is at logic 1, and data A, B, $\overline{A}$ and $\overline{B}$ are at logic 1, 0, 0 and 0, respectively. Since data signal S1 is at logic 1 (one-phase excitation mode), transistor 42 is turned ON, so that the first current is applied to motor 10. Since data A, B, $\overline{A}$ and $\overline{B}$ of signal S2 are at logic 1, 0, 0 and 0, respectively, only transistor 32 is turned ON so that winding 22 is driven by transistor 32. That is, winding 22 of motor 10 is supplied with the first current from current control section 6. In this case, the fluctuation of the rotor is small as shown in portion a of FIG. 5. As a result, driving roller 58 is rotated by pulleys 52, 56 and belt 64 so that paper 62 is fed substantially without fluctuation.

Subsequently, when CPU 2 accesses the next address "xxx1" in ROM 4, data S1 and data A, B, $\overline{A}$ and $\overline{B}$ are read from ROM 4. In this case, data S1 is at logic 0, and data A, B, $\overline{A}$ and $\overline{B}$ are at logic 1, 1, 0 and 0, respectively, as shown in FIG. 3. Since data S1 is at logic 0 (the two-phase excitation mode), transistor 42 is turned OFF, so that the second current is applied from terminal 12 to motor 10 via resistor 44. A half of the second current applied to motor 10 through resistor 44 is smaller than the first current applied to motor 10 through transistor 42 in the one-phase excitation mode. Namely, a current smaller than the first current is applied to each winding.

Since data A, B, $\overline{A}$ and $\overline{B}$ of signal S2 are at logic 1, 1, 0 and 0, respectively, transistors 32 and 34 are turned ON so that windings 22 and 24 are driven by transistors 32 and 34, respectively. That is, the operation comes into the two-phase excitation mode. In this mode, each of windings 22 and 24 in motor 10 is driven by currents smaller than the first current as shown in FIG. 4. As a result of driving the motor, driving roller 58 is driven to rotate by pulleys 52, 56 and belt 64. In this case, however, the fluctuation of the rotor can be reduced considerably as shown in FIG. 5 although motor 10 is driven in the two-phase excitation mode. Consequently, paper 62 can be transported stably. It is apparent that the fluctuation of the rotor in the two-phase excitation mode is reduced as compared with the prior art.

The above operations are similarly performed for other address information. As described above, by reducing the current applied to each of windings in the stepping motor in the two-phase excitation mode as in the present embodiment, it is possible to reduce the fluctuation of the rotor.

Current control section 6 may be formed of switch 76 and resistors 72 and 74 as shown in FIG. 6. Switch 76 is responsive to signal $\overline{S1}$ to select either resistor 72 or resistor 74. As a result, a driving current depending no a selected resistor can be applied to stepping motor 10.

Figure 7:
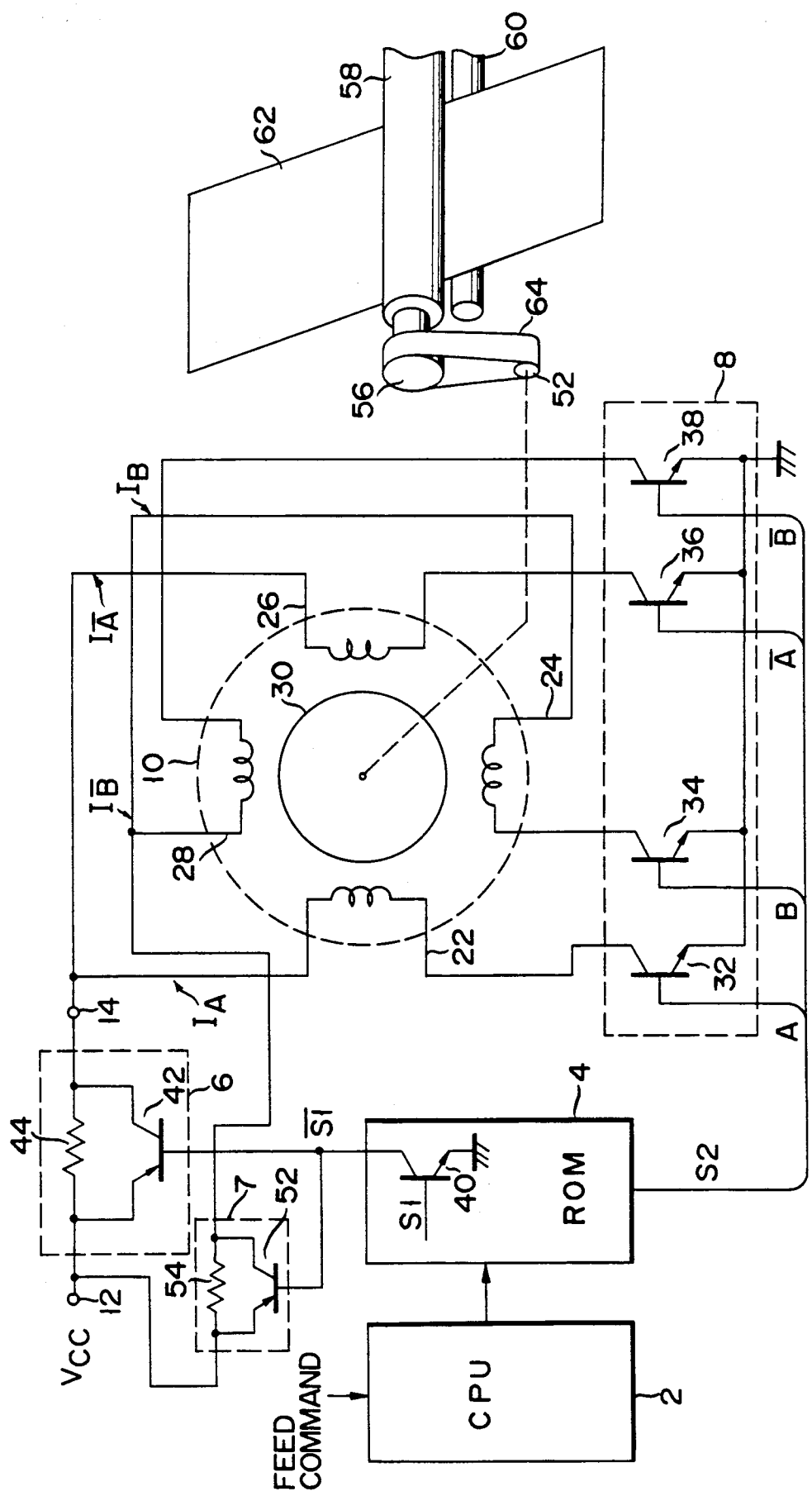
FIG. 7 is a block diagram of a stepping motor driving apparatus according to a second embodiment of the present invention.

Next, a stepping motor driving apparatus according to a second embodiment of the present invention will be described with reference to FIG. 7.

In the second embodiment another current control section 7 similar to section 6 is provided. Section 7 comprises resistor 54 and transistor 52. Section 6 supplies a driving current to windings 22 and 26 and section 7 to windings 24 and 28, so that each winding can be stably driven. The operation is similar to the first embodiment.

What is claimed is:

1. A driving apparatus for a stepping motor having a rotor and a plurality of phase windings, comprising:
   control means responsive to an input rotation command, for generating current control data and drive control data;
   current control means for controlling driving current flowing into said stepping motor to be one of first and second currents during conduction of the driving current through one or more phase windings in accordance with the current control data from said control means, comprising,
   variable resistance means for varying a resistance between a voltage source and said plurality of phase windings based on the current control data from said current control means; and
   driving means responsive to the drive control data from said control means, for selectively setting said one or more of said plurality of phase windings in a conductive state to flow the driving current controlled by said current control means.

2. The apparatus according to claim 1, wherein the first current is smaller than the second current, said control means includes means for generating the current control data such that the first current is supplied to said stepping motor when one of said plurality of phase windings is set in the conductive state during one-phase driving by said driving means in accordance with the drive control data, and the second current is supplied to said stepping motor during two-phase driving of said plurality of phase windings.

3. The apparatus according to claim 2, wherein said current control means includes:
   first resistive means for setting the driving current to the first current;
   second resistive means for setting the driving current to the second current; and
   means for selecting one of said first and second resistive means in accordance with the current control data from said control means.

4. The apparatus according to claim 1, wherein said control means comprises a ROM for storing the current control data and the drive control data, and for outputting the current control data to said current control means and the drive control data to said driving means in accordance with an address as the rotation command.

5. A method of driving a stepping motor having a rotor and a plurality of driving phase windings, comprising the steps of:
generating current control data and drive control data in response to a rotation command;
controlling a driving current flowing into the stepping motor during conduction of the driving current through one or more of the phase windings to be one of first and second currents in response to the current control data, comprising,
varying a resistance between a voltage source and said plurality of driving windings in response to the current control data; and
selectively setting said one or more of said plurality of phase windings to a conductive state in response to the drive control data.

6. The method according to claim 5, wherein the first current is smaller than the second current, said generating step includes generating the current control data such that the first current is supplied to said stepping motor when one of said plurality of phase windings is set in the conductive state during one-phase driving in accordance with the drive control data, and the second current is supplied to said stepping motor when two of said plurality of phase windings are set in the conductive states during two-phase driving in accordance with the drive control data.

7. The method according to claim 6, wherein said controlling step includes:
providing a first means for setting the driving current to the first current;
providing a second means for setting the driving current to the second current; and
selecting either the first means or the second means in accordance with the current control data.

8. The method according to claim 1, wherein the current control data and the drive control data are generated from a ROM accessed in accordance with an address as the rotation command.

* * * * *